United States Patent [19]
Bollengier et al.

[11] Patent Number: 5,428,278
[45] Date of Patent: Jun. 27, 1995

[54] OPERATING DELAY MEANS FOR A HYDRAULIC DOOR CLOSER

[75] Inventors: Dan E. Bollengier, Peru; Kurt R. Freeberg, Princeton, both of Ill.

[73] Assignee: Schlage Lock Company, San Francisco, Calif.

[21] Appl. No.: 337,908

[22] Filed: Nov. 14, 1994

Related U.S. Application Data

[63] Continuation of Ser. No. 25,512, Mar. 3, 1993, abandoned.

[51] Int. Cl.⁶ .................... E05C 17/60; E05F 15/20
[52] U.S. Cl. .................... 318/446; 318/452; 318/466; 318/484; 49/30
[58] Field of Search ........... 318/445, 446, 450, 452, 318/466, 484; 49/25, 26, 29, 30, 263, 264

[56] References Cited

U.S. PATENT DOCUMENTS

| | | | |
|---|---|---|---|
| 4,440,428 | 4/1984 | Jessup et al. | |
| 4,565,029 | 1/1986 | Kornbrekke et al. | 49/25 |
| 4,577,437 | 3/1986 | Gionet et al. | 49/25 |
| 4,604,826 | 8/1986 | Sorber | 49/31 |
| 4,658,545 | 4/1987 | Ingham et al. | 49/340 |
| 4,669,218 | 6/1987 | Kornbrekke et al. | 49/25 |
| 4,697,383 | 10/1987 | Hagiwara | 49/25 |
| 4,706,227 | 11/1987 | DuVall et al. | 367/96 |
| 4,823,010 | 4/1989 | Kornbrekke et al. | 250/341 |
| 4,973,837 | 11/1990 | Bradbeer | 250/211 |

*Primary Examiner*—Bentsu Ro
*Attorney, Agent, or Firm*—Robert F. Palermo; Bernard J. Murphy

[57] ABSTRACT

A door closure delay system produces a first signal when a person approaches a doorway housing the door. The first signal is applied to a timing system and a voltage comparator so that a second signal is produced to limit closure of an open door. The second signal is maintained for a predetermined and adjustable time period after the first signal has been removed. More patricularly, a voltage regulator provides a base or reference voltage to the comparator. A sensor, monitoring the doorway or portal, provides a signal voltage to the comparator when a physical presence is in, or in proximity to the doorway. The comparator passes on an output voltage which is stretched (i.e., has its time line extended) to circuitry coupled to a door closer, to delay the closure of the door by the closer.

9 Claims, 4 Drawing Sheets

OPERATING DELAY MEANS FOR A HYDRAULIC DOOR CLOSER

This application is a continuation of application Ser. No. 08/025,512, filed Mar. 3, 1993, now abandoned.

BACKGROUND OF THE INVENTION

This invention pertains to manually-operative hydraulic door closers for vertically-pivoted, swingable doors, and in particular to means for delaying the door-closing operation of such door closers.

Manually-operative hydraulic door closers known in the prior art operate to close an associated door immediately following an initial, manual opening thereof, and passage of a person through the portal or doorway. However, there are circumstances in which it is desired to delay the prompt closing of the door. For example, at exits of theaters, school buildings, sport arenas, shopping centers, factories, and the like, great numbers of people pass through a doorway at a given time. Consequently, it is unacceptable to have the door closer for the exit doors repeatedly and relentlessly endeavoring to close the exit doors with the through passage of each individual. More importantly, in heavy traffic situations, it is not acceptable for successive persons having to manually operate the hydraulic door closer and force a door open after someone has previously exited due to the door constantly going to closure after each individual passes through.

There is presently no known simple and efficient means for delaying the manually-operative, hydraulic door-closing function of a door closer for a selective and adjustable period of time, after one individual has manually operated the door closer, pushed open the door, and passed through the doorway, to render the portal fully open to others who may be following close behind. Prior art systems to address this problem have included complex circuitry and expensive components.

The foregoing describes limitations known to exist in present manually-operative, hydraulic, door closer devices. Thus, it is apparent that it would be advantageous to provide an alternative directed to overcoming one or more of such limitations. Accordingly, a suitable alternative is provided including features more fully disclosed hereinafter.

SUMMARY OF THE INVENTION

In one aspect of the invention, this is accomplished by providing an operating-delay means, for a manually-operative hydraulic door closer in combination with a vertically-pivoted swingable door, comprising a manually-operative hydraulic door closer; a vertically-pivoted, swingable door; wherein said closer is operatively coupled to said door; first means for sensing a physical presence in the doorway of said swingable door; second means, (a) for coupling thereof said hydraulic door closer, and (b) operative in response to a given signal for delaying operation of the closer for a selected period of time; wherein the first sensing means comprises means, responsive to such a doorway presence, for producing the given signal from the first sensing means to the second means to cause responsive operation of the second means.

In accordance with another aspect of the invention, this is accomplished by means for producing a first signal when a person approaches a doorway housing the manually-opened door and means for applying the first signal both to a timing system and voltage comparison means so that the voltage comparison means produces a second signal to limit door closure of the open door. Means are provided for maintaining the second signal for a pre-determined and adjustable time period after the first signal has been removed.

The foregoing, and other aspects of the invention, will become apparent from the following detailed description of an embodiment of the invention, when considered in conjunction with the accompanying drawing figures.

BRIEF DESCRIPTION OF THE DRAWING FIGURES

DETAILED DESCRIPTION

Figure 1:
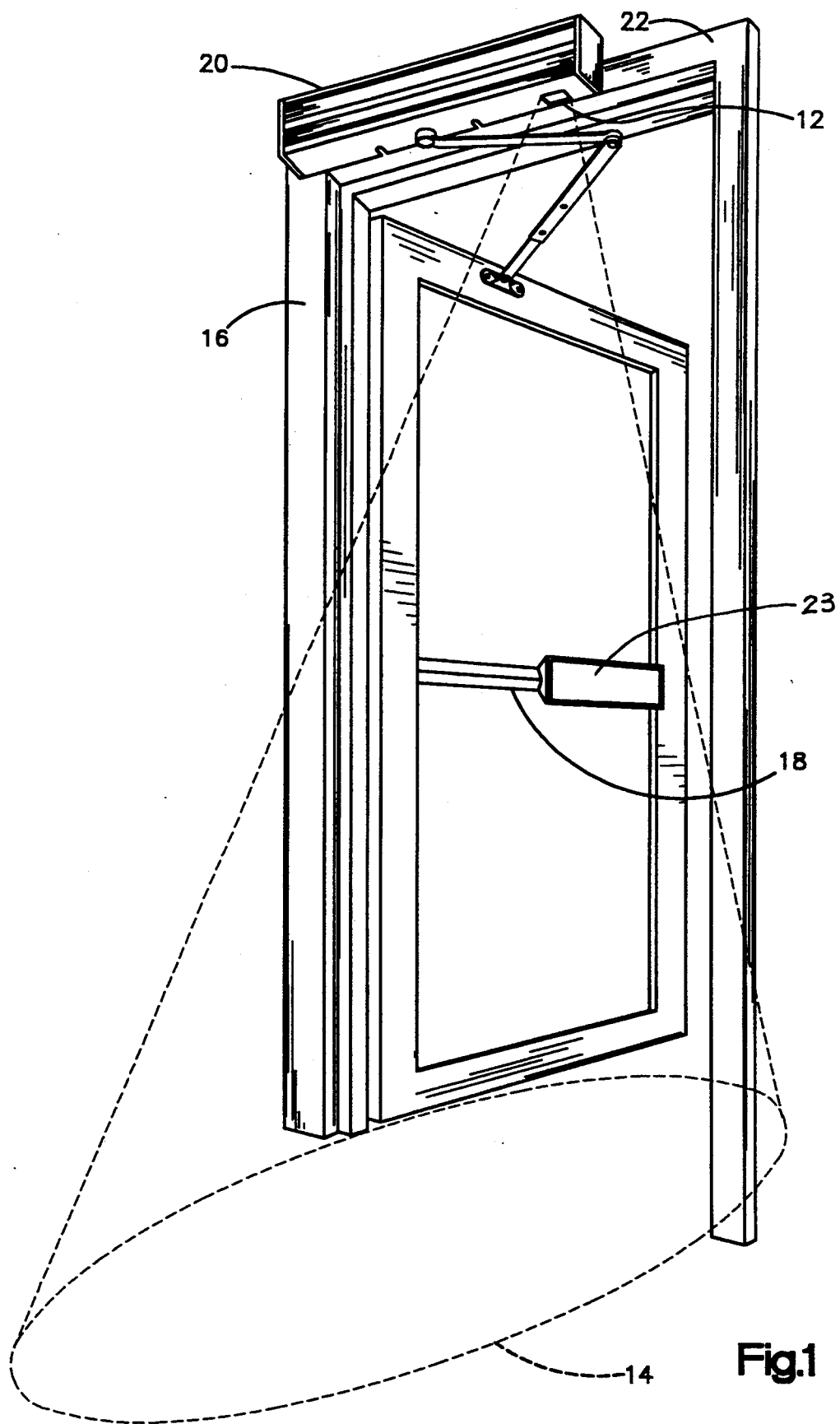
FIG. 1 is a perspective view illustrating a typical doorway and door closer-operated door, showing a sensing area for the novel operating-delay means for a manually-operative, hydraulic door closer.

The invention 10 comprises a sensor 12 for detecting a physical presence in, or in proximity to, the doorway of a door. The sensor can be of any one of several suitable devices, such as microwave, infrared, ultrasonic or other scanning means, or a floor mat or the like. In this embodiment, sensor 12 comprises an infrared means shown in FIG. 1 set within door closer 20, scanning the sensing area 14 of a doorway 16 to which a door 18 is mounted. The door closer 20 is of the typical, manually-operated, hydraulic type. It is shown operatively coupled to the door 18, and is mounted to the header 22 of the doorway. The door 18 has a transverse bar 23, as shown in FIG. 1, for persons to engage and push, in order to operate the hydraulic door closer and open the door 18. By way of explanation, the door closer 20 is manually-operated, in that it is necessary for one to physically push the door 18 open, and thereby operate the door closer 20 (i.e., displacing it to its opened disposition). If not delayed in doing so, by the operating-delay means 10, the door closer 20 will, subsequently, and hydraulically, close the door 18.

Figure 2:
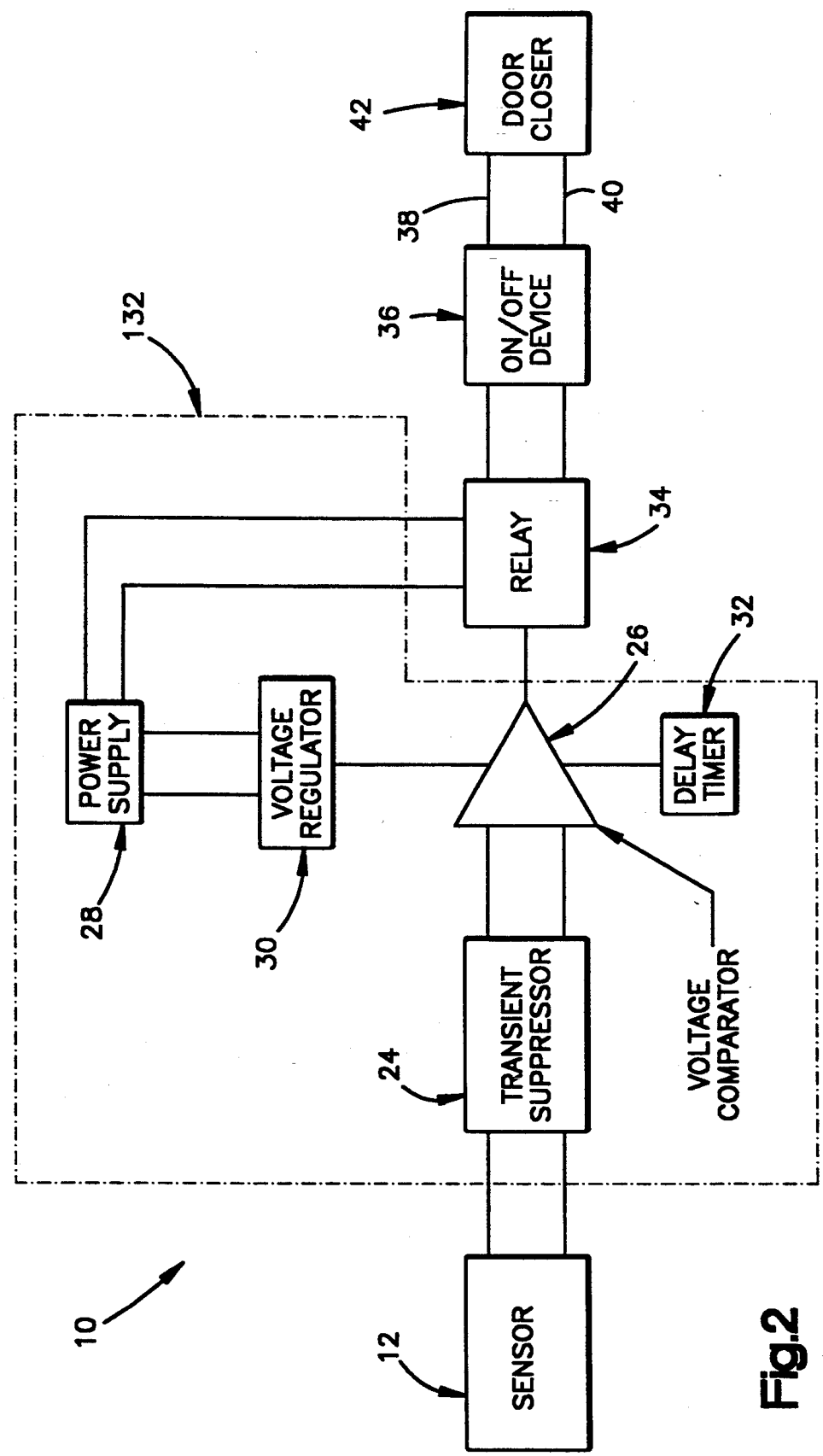
FIG. 2 is a block diagram of the inventive operating-delay means, according to an embodiment thereof.

With particular reference to FIG. 2, it will be seen that the novel operating-delay means 10 for a hydraulic door closer comprises the sensor 12. The latter produces a signal voltage, upon sensing a physical presence within the sensing area 14 of infrared sensor 12. The signal voltage is conducted to a transient suppressor 24 in which stray, transient signals are screened out. The signal voltage is then conducted from the suppressor 24 to a voltage comparator 26. A power supply 28, coupled to a voltage regulator 30, also conducts a basic reference voltage to the comparator 26. In the comparator 26, an absence of a signal voltage from the sensor 12 will cause no operation of the invention beyond comparator 26.

In the presence of a signal voltage, the comparator will produce an output voltage. A delay timer 32 is coupled to the comparator 26, and adds time line to the output voltage, i.e., it adds to, or stretches out the duration of the output voltage. In turn, the output voltage is conducted to a normally-open relay 34 to cause the relay to close. The relay 34 is coupled to an on/off switching device 36 which is normally in an "off" disposition. When the relay 34 is in a closed condition, that causes the device 36 to change to an "on" disposition. The switching device 36, is interposed in the power lines 38 and 40 of the door closer 42 which is comprised of a hydraulic cylinder 154 and electro-mechanical solenoid 156, to enable the delaying function for the closer 42.

Figure 3:
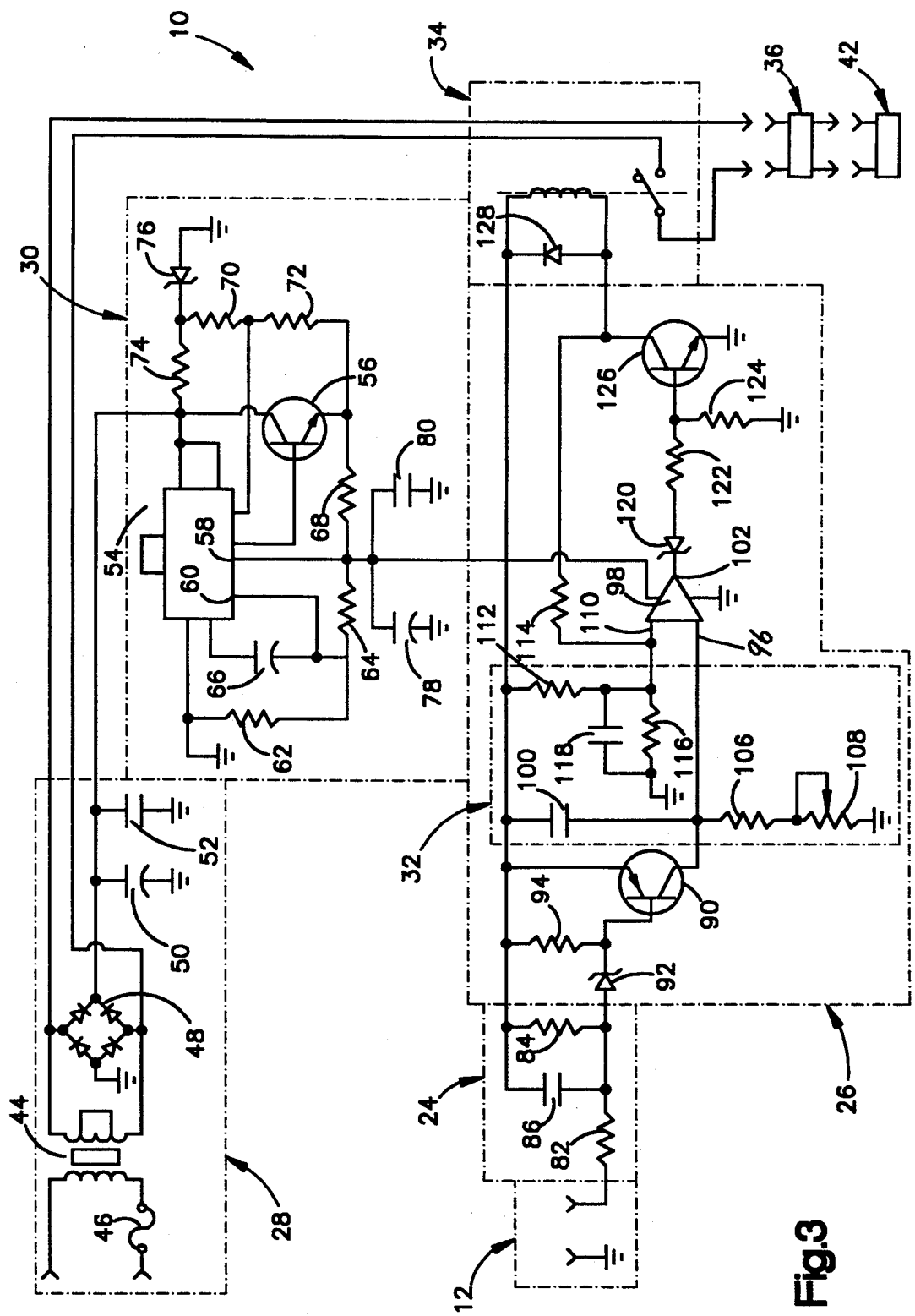
FIG. 3 is a detailed schematic diagram of the operating-delay means of FIG. 2.

In the detailed schematic of FIG. 3, the power supply 28 comprises a transformer 44 with input protection from a fuse 46. A bridge rectifier 48 converts the input a.c. voltage to d.c. voltage, with capacitor 50 providing d.c. filtering, and capacitor 52 providing high frequency, r.f. filtering. The voltage regulator 30 has an integrated circuit 54, which is the regulator chip, with a pass transistor 56. A pin 58 of the regulator 30 monitors the output voltage with respect to the reference or base voltage; the latter is established on pin 60 by resistors 62 and 64. Capacitor 66 is a high frequency r.f. filter. Any difference in the two voltages, i.e., between the output voltage, and the base or reference voltage, causes transistor 56 to be re-biased to re-establish the correct output voltage.

The voltage regulator 30 has fold back current limiting which protects the power supply 28 from damage by a short circuit. This is provided by resistors 68, 70, and 72. It functions by monitoring the voltage drop across resistor 68. As the voltage drop across resistor 68 increases to a point set by resistors 70 and 72, the integrated circuit 54 begins to shut down the pass transistor 56. As the voltage drop across resistor 68 continues to increase, due to the increased current flow, the output voltage will decrease proportionally. This type of fold back current limiting allows the power supply 28 to operate in a dead short condition indefinitely, and then return to normal operation when the short is removed. Resistor 74 and diode 76 constitute a pre-regulator which stabilizes the current limiting sensing circuit in the integrated circuit 54. Capacitor 78 provides d.c. filtering of the output voltage, and capacitor 80 provides high frequency filtering thereof.

Resistors 82 and 84, and capacitor 86 make up an RC network; it has a time constant which provides an immunity to false triggering from transients. The trigger signal, from the sensor 12 is accomplished by applying d.c. ground to resistor 82. The signal is coupled to transistor 90 through resistor 82 and diode 92 which provide the proper bias current to turn on transistor 90. Resistor 94 is a pull-up resistor to keep transistor 90 off until an input signal, a first triggering signal, is received. When transistor 90 is turned on by a triggering signal, it applies a positive twelve volt level to pin 96 of an operational amplifier 98 which is wired as a voltage comparator, and charges capacitor 100. At this time, the output pin 102 goes high to provide a second signal and turns on relay 34.

The time delay function does not start until the input, triggering signal is removed. At this point, transistor 90 is turned off and capacitor 100 proceeds to discharge through resistors 106 and 108. Resistor 108 is adjustable, and provides for a variation of the time delay. It is to be noted that resistor 108 may be adjusted by means (not shown), including a human operator, to extend the delay when high traffic conditions are expected (e.g. at the end of a movie or at shift closing time); conversely, the delay may be shortened at times of expected low traffic.

The op-amp comparator 98 functions by comparing the input, triggering signal voltage on pin 96 with the reference voltage pin 110 thereof. The reference or base voltage is established by resistors 112, 114 and 116 and capacitor 118. In stand-by condition, the reference or base voltage is approximately eight and eight-tenths volts. When the timing cycle starts, the reference voltage is reduced to approximately four and four-tenths volts. This is due to the referencing of resistor 82 to ground instead of to a plus voltage. This means that pin 96 must now drop below four and four-tenths volts before the timing cycle ends. At this point, the output pin 102 goes low causing diode 120 to de-energize the relay 34. The reference voltage returns to eight and eight-tenths volts at this time, and the invention is ready for a next input, triggering signal. If at any time during the timing cycle (before pin 102 goes low), a new triggering signal is received, capacitor 100 charges again and the complete timing starts over again. Thus, if a new trigger signal is received before capacitor 100 discharge reaches a predetermined lower voltage level, pin 102 stays high and door closure is limited. Resistors 122 and 124 provide the bias for transistor 126, and diode 128 is a clamping diode to provide transistor 126 with transient protection when shutting down relay 34.

Figure 4:
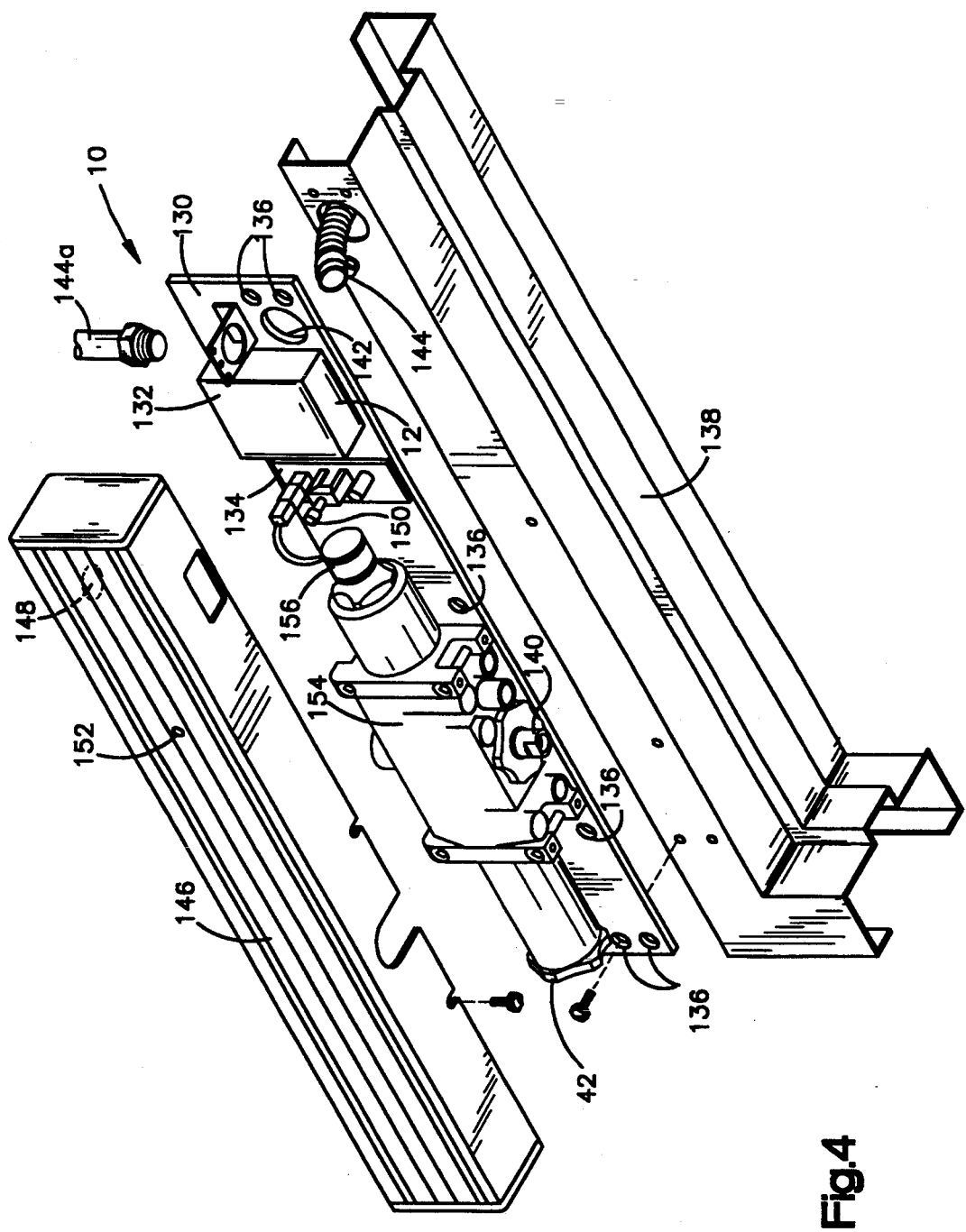
FIG. 4 is an exploded view of an embodiment of the invention as packagable and mountable to the header of a door frame.

FIG. 4 shows the inventive operating-delay means 10 packagable and mountable to the header of a door frame. A platform 130 mounts thereon the hydraulic door closer 42 and a controller unit 132 which comprises the transient suppressor 24, voltage comparator 26, power supply 28, voltage regulator 30, the delay timer 32, the sensor 12, and relay 34. Another unit 134, mounted to the platform 130, comprises the on/off switching device 36. The platform 130 has fastener holes 136 formed therein to accommodate its fixing thereof to the header 138 of a door frame. The stub 140 is where, according to known practices, the arm (not shown) of the door closer is coupled. The platform 130 has an aperture 142 formed therein through which to accommodate an electrical conduit 144, confined within the header 138, for connecting an optional sensor, i.e., a floor mat, to the controller 132. Alternatively, the floor mat can be connected to the controller 132 externally. A cover 146 is provided for fastening thereof to the door closer 42, and the cover 146 has an aperture 148 formed in the obscured side thereof through which to receive an electrical conduit 144a (in lieu of conduit 144) from a floor mat sensor. The on/off switching device 36 comprises a supervisory, access switch 150 which can be manually accessed, via a hole 152 provided therefore in the cover 146; switch 150 provides for manual turning on or off of the operating-delay means 10.

While we have described our invention in connection with a specific embodiment thereof, it is to be clearly understood that this is done only by way of example and not as a limitation to the scope of the invention, as set forth in the appended claims.

Having described the invention, what is claimed is:

1. Operating-delay means for a hydraulic door closer in combination with a vertically-pivoted, swingable door, which door must be manually opened, comprising:

a hydraulic door closer which is movable to an open disposition thereof only in response to a manual opening of an associated door;

a door, manually operative; wherein said closer is operatively coupled to said door for operation thereof in response to an opening of said door;

first means for sensing a physical presence of an object in the doorway of said door;

second means, (a) for coupling the first sensing means to said hydraulic door closer, and (b) operative in response to a given signal for delaying operation of said closer for a selected period of time, wherein said first sensing means comprises means, responsive to such a doorway presence, for producing said given signal; and means for communicating said given signal from said first sensing means to said second means to cause responsive operation of said second means.

2. The combination, according to claim 1, wherein said second means comprises a source of a first, base, reference voltage, said given signal comprises a second signal voltage, said second means further comprises means for comparing said first and second voltages, and producing a third, output voltage upon said second voltage exceeding said first voltage, and said second means also comprises means, responsive to said third voltage, for electrically disabling said door closer for said period of time.

3. The combination, according to claim 2, wherein said disabling means comprises (a) a normally-open relay, and (b) a normally off, on/off voltage control device for coupling interpositionally said relay to said door closure, said relay comprises means responsive to such a third voltage for switching said relay from said normally-open condition to a closed condition, and said device comprises means responsive to a closure of said relay for changing said device from a normally off condition to an on condition.

4. The combination, according to claim 1, wherein said second means comprises means for selectably varying said period of time.

5. The combination according to claim 1, further including:

a platform, wherein said second means is mounted upon said platform, and said platform comprises means for mounting said platform to a doorway header frame.

6. The combination, according to claim 5, further including:

a cover for shielding said second means and for mounting upon said platform.

7. The combination, according to claim 6, wherein said cover has an aperture formed therein for accommodating therethrough said signal communicating means.

8. The combination, according to claim 6, wherein said platform has an aperture formed therein for interfacing with a doorway header frame for accommodating, through said aperture, said signal communicating means from such frame.

9. The combination, according to claim 6, wherein said second means comprises an on/off switch operative for enabling and disabling an operating-delay means, and said cover has an access hole formed therein, for alignment with said switch, to accommodate manual operation of said switch via said access hole.

* * * * *